(12) United States Patent
Han et al.

(10) Patent No.: US 10,498,956 B2
(45) Date of Patent: *Dec. 3, 2019

(54) PHOTOGRAPHING APPARATUS FOR PHOTOGRAPHING PANORAMIC IMAGE USING VISUAL ELEMENTS ON A DISPLAY, AND METHOD THEREOF

(71) Applicant: SAMSUNG ELECTRONICS CO., LTD., Suwon-si (KR)

(72) Inventors: Sang-jun Han, Seoul (KR); Yong-gook Park, Yongin-si (KR); Ju-il Eom, Suwon-si (KR); Sang-ok Cha, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/861,219

(22) Filed: Sep. 22, 2015

(65) Prior Publication Data

US 2016/0014336 A1  Jan. 14, 2016

Related U.S. Application Data

(63) Continuation of application No. 14/036,887, filed on Sep. 25, 2013, now Pat. No. 9,167,156, which is a (Continued)

(30) Foreign Application Priority Data

Jan. 31, 2011   (KR) .................. 10-2011-0009786

(51) Int. Cl.
H04N 7/00   (2011.01)
H04N 5/232   (2006.01)
(Continued)

(52) U.S. Cl.
CPC ....... *H04N 5/23238* (2013.01); *G06F 3/0412* (2013.01); *G06F 3/0416* (2013.01);
(Continued)

(58) Field of Classification Search
CPC ...... H04N 5/232; H04N 1/2112; H04N 1/215; H04N 1/3876; H04N 5/23219;
(Continued)

(56) References Cited

U.S. PATENT DOCUMENTS 7,515,177 B2   4/2009  Yoshikawa
7,639,897 B2 * 12/2009  Gennetten .............. H04N 5/232
                                              348/36
(Continued)

FOREIGN PATENT DOCUMENTS

CN   101150669 A   3/2008
EP   0942598 A2   9/1999
(Continued)

OTHER PUBLICATIONS

Communication from the Australian Patent Office dated Feb. 9, 2016 in a counterpart Australian Application No. 2012211608.
(Continued)

*Primary Examiner* — Jessica M Prince
(74) *Attorney, Agent, or Firm* — Sughrue Mion, PLLC

(57) ABSTRACT

A photographing method and apparatus is provided. The photographing apparatus includes a photographing unit; a sensing unit for sensing motion of the photographing apparatus; a display unit for displaying at least one guide image for panorama photographing; a controller for controlling the photographing unit to automatically photograph, if a photographing direction that changes in accordance with motion of the photographing apparatus corresponds to one of the at least one guide image; and a storage unit for storing the photographed image data.

13 Claims, 7 Drawing Sheets

Related U.S. Application Data continuation of application No. 13/362,901, filed on Jan. 31, 2012.

(51) Int. Cl.
*G06F 3/041* (2006.01)
*H04N 5/341* (2011.01)

(52) U.S. Cl.
CPC ..... *H04N 5/23232* (2013.01); *H04N 5/23258* (2013.01); *H04N 5/23293* (2013.01); *H04N 5/3415* (2013.01)

(58) Field of Classification Search
CPC ........... H04N 5/23232; H04N 5/23238; H04N 5/23258; H04N 5/23293; H04N 5/3415; G06K 9/6202; G06F 3/0412; G06F 3/0416
USPC .......................................................... 348/36
See application file for complete search history.

(56) References Cited

U.S. PATENT DOCUMENTS

| | | | |
|---|---|---|---|
| 8,077,231 B2 | 12/2011 | Gulliksson | |
| 8,791,983 B2 | 7/2014 | Shikata | |
| 2004/0125044 A1 | 7/2004 | Suzuki | |
| 2005/0099494 A1 | 5/2005 | Deng et al. | |
| 2005/0168621 A1 | 8/2005 | Kageyama et al. | |
| 2006/0114332 A1 | 6/2006 | Yoshikawa | |
| 2007/0172151 A1* | 7/2007 | Gennetten | H04N 5/232 382/299 |
| 2007/0253698 A1 | 11/2007 | Park et al. | |
| 2007/0269198 A1 | 11/2007 | Park et al. | |
| 2007/0291155 A1 | 12/2007 | Kawaguchi et al. | |
| 2008/0031542 A1 | 2/2008 | Lei | |
| 2008/0074489 A1* | 3/2008 | Zhang | G06T 3/4038 348/36 |
| 2008/0074506 A1 | 3/2008 | Oh et al. | |
| 2008/0118183 A1 | 5/2008 | Teo | |
| 2008/0180550 A1* | 7/2008 | Gulliksson | H04N 5/232 348/231.99 |
| 2008/0192125 A1* | 8/2008 | Kang | H04N 5/232 348/222.1 |
| 2009/0021576 A1* | 1/2009 | Linder | G03B 37/00 348/36 |
| 2009/0040292 A1 | 2/2009 | Miyata | |
| 2009/0153720 A1 | 6/2009 | Suzuki et al. | |
| 2010/0066810 A1* | 3/2010 | Ryu | H04N 5/232 348/36 |
| 2010/0302347 A1 | 12/2010 | Shikata | |
| 2011/0022982 A1 | 1/2011 | Takaoka et al. | |
| 2011/0069149 A1 | 3/2011 | Park et al. | |
| 2011/0267530 A1* | 11/2011 | Chun | G06F 3/04883 348/333.11 |
| 2011/0279683 A1 | 11/2011 | Yarmchuk et al. | |
| 2014/0118487 A1 | 5/2014 | Shikata | |

FOREIGN PATENT DOCUMENTS

| | | | |
|---|---|---|---|
| EP | 1 130 906 A2 | 9/2001 | |
| EP | 1613060 A1 | 1/2006 | |
| EP | 1850583 A2 | 10/2007 | |
| EP | 1890481 A1 | 2/2008 | |
| EP | 2164244 A1 | 3/2010 | |
| JP | 11-69293 A | 3/1999 | |
| JP | 2000-101895 A | 4/2000 | |
| JP | 2004-184862 A | 7/2004 | |
| JP | 2005191978 | 7/2005 | |
| JP | 2007236668 | 9/2007 | |
| JP | 2008-504758 A | 2/2008 | |
| JP | 2008-187393 A | 8/2008 | |
| JP | 2008-288798 A | 11/2008 | |
| JP | 2009-60278 A | 3/2009 | |
| JP | 2009163220 | 7/2009 | |
| JP | 2009-278432 A | 11/2009 | |
| JP | 2010-199971 A | 9/2010 | |
| JP | 2010-278587 A | 12/2010 | |
| RU | 2007131219 A | 2/2009 | |
| WO | 00/08889 A1 | 2/2000 | |
| WO | 2006/002796 A1 | 1/2006 | |

OTHER PUBLICATIONS

Communication from the Russian Patent Office dated Feb. 12, 2016 in a counterpart Russian application No. 2013140392/07.
Communication from the Indonesian Patent Office dated Feb. 15, 2016 in a counterpart Indonesian application No. W-00201303926.
Communication from the State Intellectual Property Office of P.R. China dated Mar. 2, 2016 in a counterpart Chinese application No. 201280007176.9.
Communication from the Japanese Patent Office dated Mar. 28, 2016 in a counterpart Japanese application No. 2013-551906.
Communication from the Japanese Patent Office dated Oct. 9, 2015 in a counterpart Japanese application No. 2013-551906.
Communication from the Australian Patent Office dated Oct. 27, 2015 in a counterpart Australian Application No. 2012211608.
Chris Hall, "360 Panorama Review", 148Apps.com, Sep. 30, 2010 [retrieved from the Internet on Oct. 27, 2015], URL: http://web.archive.org/web/20101005015911/http://www.148apps.com/reviews/360-panorama-review/> Published on or before Oct. 5, 2010 as per Wayback Machine, total 4 pages.
Communication dated Jun. 8, 2016 issued by the Australian Patent Office in counterpart Australian Patent Application No. 2012211608.
Communication dated Aug. 25, 2016 issued by the Australian Patent Office in counterpart Australian Patent Application No. 2012211608.
Communication dated Oct. 25, 2016 issued by Australian Intellectual Property Office in counterpart Australian Patent Application No. 2012211608.
Communication dated Feb. 28, 2017, issued by the State Intellectual Property Office of P.R. China in counterpart Chinese Application No. 201280007176.9.
Communication dated Mar. 22, 2017, issued by the European Patent Office in counterpart European Application No. 12741518.0.
Communication dated Aug. 14, 2017 by the Japan Patent Office in counterpart Japanese Patent Application No. 2016-148248.
Communication dated Oct. 23, 2017 by the State Intellectual Property Office of P.R. China in counterpart Chinese Patent Application No. 201280007176.9.
Communication dated Nov. 7, 2017 by the Australian Patent Office in counterpart Australian Patent Application No. 2016250418.
Communication dated Mar. 2, 2018, issued by the European Patent Office in counterpart European application No. 12741518.0.
Communication dated Jan. 23, 2018, issued by the Chinese Patent Office in counterpart Chinese application No. 201610079947.5.
Communication dated Feb. 9, 2018, issued by the Japanese Patent Office in counterpart Japanese application No. 2016-148248.
Communication dated Dec. 28, 2017, issued by the Canadian Patent Office in counterpart Canadian application No. 2826081.
Communication dated Mar. 7, 2018, issued by the Australian Patent Office in counterpart Australian application No. 2016250418.
Communication dated Apr. 18, 2018, issued by the Indonesian Patent Office in counterpart Indonesian Application No. W-00201303926.
Communication dated Jun. 5, 2018, issued by the Australian Patent Office in counterpart Australian Application No. 2016250418.
Communication dated Jul. 16, 2018 by the State Intellectual Property Office of P.R. China in counterpart Chinese Patent Application No. 201610079947.5.
Communication dated Aug. 9, 2018 by the European Patent Office in counterpart European Patent Application No. 12741518.0.
Communication dated Aug. 28, 2018 by the Intellectual Property Office of Australia in counterpart Australian Patent Application No. 2016250418.
Communication dated Mar. 27, 2019, issued by the European Patent Office in counterpart European Application No. 12 741 518.0.

(56) References Cited

OTHER PUBLICATIONS

Communication dated Apr. 12, 2019, issued by the Indian Patent Office in counterpart Indian Application No. 4730/CHENP/2013.
Communication dated Oct. 12, 2018, issued by the Canadian Patent Office in counterpart Canadian Application No. 2,826,081.
Communication dated Dec. 28, 2018, issued by the Indian Patent Office in counterpart Indian Application No. 4730/CHENP/2013.
Communication dated Jul. 25, 2019, issued by the Canadian Patent Office in counterpart Canadian Application No. 2,826,081.

* cited by examiner

PHOTOGRAPHING APPARATUS FOR PHOTOGRAPHING PANORAMIC IMAGE USING VISUAL ELEMENTS ON A DISPLAY, AND METHOD THEREOF

CROSS REFERENCE TO RELATED APPLICATION

This application is a Continuation Application of U.S. patent application Ser. No. 14/036,887, filed Sep. 25, 2013, which is a Continuation Application of U.S. application Ser. No. 13/362,901, which was filed in U.S. Patent and Trademark Office on Jan. 31, 2012, and claims priority under 35 U.S.C. § 119(a) to Korean Patent Application No. 10-2011-0009786, filed on Jan. 31, 2011 in the Korean Intellectual Property Office. The entire disclosures of prior applications are considered part of the disclosure of the accompanying continuation application, and are hereby incorporated by reference.

BACKGROUND OF THE INVENTION

1. Field of the Invention

The present invention relates generally to a photographing apparatus for photographing a panoramic image and a method thereof, and, more particularly, to a photographing apparatus that provides a plurality of guide images, allowing a user to photograph a panoramic image easily, and a method thereof.

2. Description of the Related Art

With the development of electronic technologies, various types of electronic devices have been developed and are now widely used. Specifically, a compact mobile device with various functions such as a smart phone has recently become popular.

Such a mobile device may provide a photographing function. Thus, users can take various pictures or videos using the devices they always carry, and can share their photographed images with others by uploading such images onto websites or blogs. The images photographed by the device may be used as road view images. If the images are to be used as road view images, a panoramic image in which several images are connected to one another is more useful than a single image which was photographed from one point of view. In other words, since the size of an image that can be contained in one photo sheet is limited, a wide image is generated by photographing several still images and combining them. This photographing method is referred to as a panoramic image photographing method.

However, in order to obtain such a panoramic image, a photographing apparatus should continuously photograph images at various angles. Therefore, even if the photographing apparatus has a panorama function, it is not easy for users to photograph a panoramic image while changing the angle.

Therefore, there is a demand for a method for photographing a panoramic image easily and conveniently.

SUMMARY OF THE INVENTION

An aspect of the present invention is to substantially solve at least the above problems and/or disadvantages and to provide at least the advantages below.

An aspect of the present invention provides a photographing apparatus that provides a plurality of guide images, thereby allowing a user to photograph a panoramic image easily, and a method thereof.

According to an aspect of the present invention, a photographing apparatus is provided. The apparatus includes a photographing unit; a sensing unit for sensing motion of the photographing apparatus; a display unit for displaying at least one guide image for panorama photographing; a controller for controlling the photographing unit to automatically photograph, if a photographing direction that changes in accordance with motion of the photographing apparatus corresponds to one of the at least one guide image; and a storage unit for storing the photographed image data.

According to another aspect of the present invention, a method for photographing a panoramic image of a photographing apparatus is provided. The method includes displaying at least one guide image for panorama photographing; sensing motion of the photographing apparatus; automatically photographing, if a photographing direction that changes in accordance with motion of the photographing apparatus corresponds to one of the at least one guide image; and storing the photographed image data.

According to another aspect of the present invention, a photographing apparatus is provided. The apparatus includes a photographing unit; a display unit for displaying a screen image; a sensing unit for sensing motion of the photographing apparatus; a graphic processor for displaying at least one guide image and a photographing focus on the screen image, and changing a position of the photographing focus depending on the motion of the photographing apparatus; a controller for controlling the photographing unit to automatically photograph, if the photographing focus matches one of the plurality of guide images; and a storage unit for storing photographed image data to make a panoramic image.

BRIEF DESCRIPTION OF THE DRAWINGS

The above and/or other aspects will be more apparent by describing in detail embodiments, with reference to the accompanying drawings, in which.

DETAILED DESCRIPTION OF EMBODIMENTS OF THE PRESENT INVENTION

Figure 1:
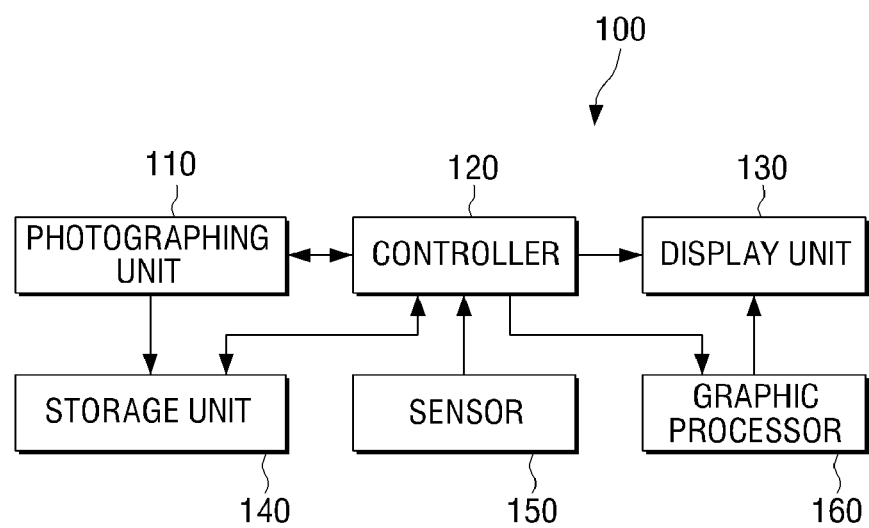
FIG. 1 is a block diagram illustrating a photographing apparatus according to various embodiments.

In the following description, the same reference numerals are used for the same elements when they are depicted in different drawings. Functions or elements known in the related art are not described in detail since they would obscure the embodiments with unnecessary detail.

FIG. 1 is a block diagram illustrating a photographing apparatus according to embodiments of the present invention.

A photographing apparatus 100 refers to an apparatus that creates an image using an image sensing element collecting light reflected from a subject through a lens, and converts the image into electric signals and records those signals on a recording medium such as a magnetic tape or a memory card or transmits the signals through a network. The photographing apparatus 100 illustrated in FIG. 1 may be a video data capturing apparatus such as a camcorder. However, the photographing apparatus 100 is not so limited and may be a camera for photographing a still image or any other apparatus with a photographing capability such as a mobile phone, a Personal Digital Assistant (PDA), or a tablet Personal Computer (PC).

As shown in FIG. 1, the photographing apparatus 100 includes a photographing unit 110, a controller 120, a display unit 130, a storage unit 140, a sensing unit 150, and a graphic processor 160.

The photographing unit 110 photographs by receiving light reflected from an object to be photographed, that is, a subject, and outputs photographed image data. This image data includes not only simple still image data but also video data. The photographing unit 110 may include an image sensing element, a lens, and an aperture.

As the image sensing element, a Charge-Coupled Device (CCD) or a Complementary Metal Oxide Semiconductor (CMOS) image sensor may be used. In other words, the photographing unit 110 performs the photographing step using an array image sensor (a two dimensional image sensor). The image sensor may be called a CCD image sensor or a CMOS image sensor according to whether the image sensing element is the CCD or the CMOS.

The CCD is a sensor that obtains an image by converting light into electric charge. The CCD includes a circuit in which a plurality of condensers, which gather and direct visible light, are connected one another in pairs.

The CMOS is a sensor that includes an integrated circuit in which Metal-Oxide Semiconductor Field-Effect Transistors (MOSFET) of a p-channel and an n-channel are connected to each other in series between power voltages and an input is connected to gates of the two MOSFETs and an output is connected between drains of the two MOSFETs.

The display unit 130 displays the image photographed by the photographing unit 110 on a screen. Since the photographing unit 110 outputs an image corresponding to reflected light from when the photographing apparatus 100 is turned on or a photographing menu is selected, the display unit 120 displays a screen image corresponding to light entering the photographing unit 110 even in a standby mode.

The display unit 130 may be implemented as a Liquid Crystal Display (LCD) panel like a general mobile device. However, this should not be considered as limiting. The display unit 130 may be implemented as a touch screen. Accordingly, a user may input various commands such as one to photograph by touching the touch screen or selecting various keys (not shown) provided on a body of the photographing apparatus 100.

If the user inputs a command to photograph in standby mode, the controller 120 controls the photographing unit 110 to perform the photographing step. Accordingly, image data corresponding to a screen image when the command to photograph is input is generated and stored in the storage unit 140.

The sensing unit 150 senses a motion of the photographing apparatus 100. The motion refers to a motion of a body of the photographing apparatus 100 such as a motion in which the photographing apparatus 100 is rotated, changing a photographing angle, and a motion in which the photographing apparatus 100 moves in a direction without changing the photographing angle.

The sensing unit 150 may be implemented as various types of sensors such as a gravitational acceleration sensor, a geomagnetic sensor, and a gyro sensor.

For example, if the sensing unit 150 is implemented as a flux gate geomagnetic sensor using a flux gate, the sensing unit 150 may include flux gate cores made of material of high permeability such as permalloy (e.g., a nickel-iron magnetic allow), driving coils and detection coils winding the cores. The number of flux gate cores may be two or three. The flux gate cores may be formed in a mutually orthogonal pattern. In other words, in the case of a two-axis flux gate sensor, the flux gate cores may be implemented with X and Y-axis flux gates. In the case of a three-axis flux gate sensor, the flux gate cores may be implemented with X Y and and Z-axis flux gates. If a driving signal is applied to each driving coil winding each flux gate core, magnetism is induced by the core. By detecting a $2^{nd}$ order harmonic component, which is proportional to an external magnetic field using the detection coil, size and direction of the external magnetic field is measured. By comparing the currently measured direction of the magnetic field with a previously measured direction, angle and direction of rotation are sensed.

In another example, the sensing unit 150 may include a gyro sensor. The gyro sensor measures an angle changes in one second. Specifically, a Coriolis force is generated when an object moves. The gyro sensor senses an angular velocity acting in an inertial system using a formula regarding the Coriolis force. Accordingly, the angle and direction of the rotation are sensed.

In order to compensate for an effect caused by inclination of the photographing apparatus 100, the photographing apparatus 100 may further include an acceleration sensor. In other words, considering an inclination angle such as a pitch angle or a roll angle measured by the acceleration sensor, the sensing unit 150 can accurately calculate the angle and direction of the rotation.

As described above, the sensing unit 150 may use a variety of sensors and a more detailed explanation regarding configuration and step of such sensors is omitted.

The graphic processor 160 generates a plurality of guide images and a photographing focus for photographing a panoramic image and displays them on the screen of the display unit 130.

The plurality of guide images disclosed herein refers to images that guide the photographing apparatus 100 to move at a photographing angle necessary for forming the panoramic image. The number of guide images corresponds to the number of images that are needed to form the panoramic image.

If the panoramic image is a general panoramic image extending in a horizontal direction, the plurality of guide images are arranged in a single line and displayed on the screen image. On the other hand, if the panoramic image is a 360-degree spherical panoramic image forming a single spherical surface, the plurality of guide images are arranged in multiple lines and displayed on the screen image. The positions of the guide images are fixed on the screen image. A method for arranging the guide images will be explained in detail below.

The photographing focus refers to a focus guide image corresponding to a current photographing direction. The photographing focus moves according to the motion of the photographing apparatus 100. In other words, if the user rotates the photographing apparatus 100 to the left, the photographing focus moves to the left. If the user moves up the photographing apparatus 100, the photographing focus moves up. As described above, the photographing focus moves in vertical and horizontal directions on the screen image.

The user may control the photographing focus in order to overlap one of the guide images by moving the photographing apparatus 100. Accordingly, if the photographing focus matches one guide image, the controller 120 can control the photographing unit 110 to photograph automatically at that time. Therefore, the user can obtain images photographed at various angles for the panoramic image simply by moving the photographing focus to match the guide image like a game.

If the photographing step for each guide image has been completed, the controller 120 combines image data that has been photographed and stored in the storage unit 140 and generates panoramic image data.

More specifically, the controller 120 extracts data regarding characteristics of a plurality of images photographed based on the guide images. The controller 120 determines matching parts by comparing the extracted data. The matching parts are connected to one another and the connected parts are processed by blending, such that a single panoramic image is generated. The generated panoramic image may be stored in the storage unit 140.

The storage unit 140 may be an internal memory which is provided in the photographing apparatus 100 or a memory card or a Universal Serial Bus (USB) memory stick which is easily removable from the photographing apparatus 100. Also, the storage unit 140 may be an external storage unit connected to the photographing apparatus 100 through a wired or wireless interface.

Figure 2:
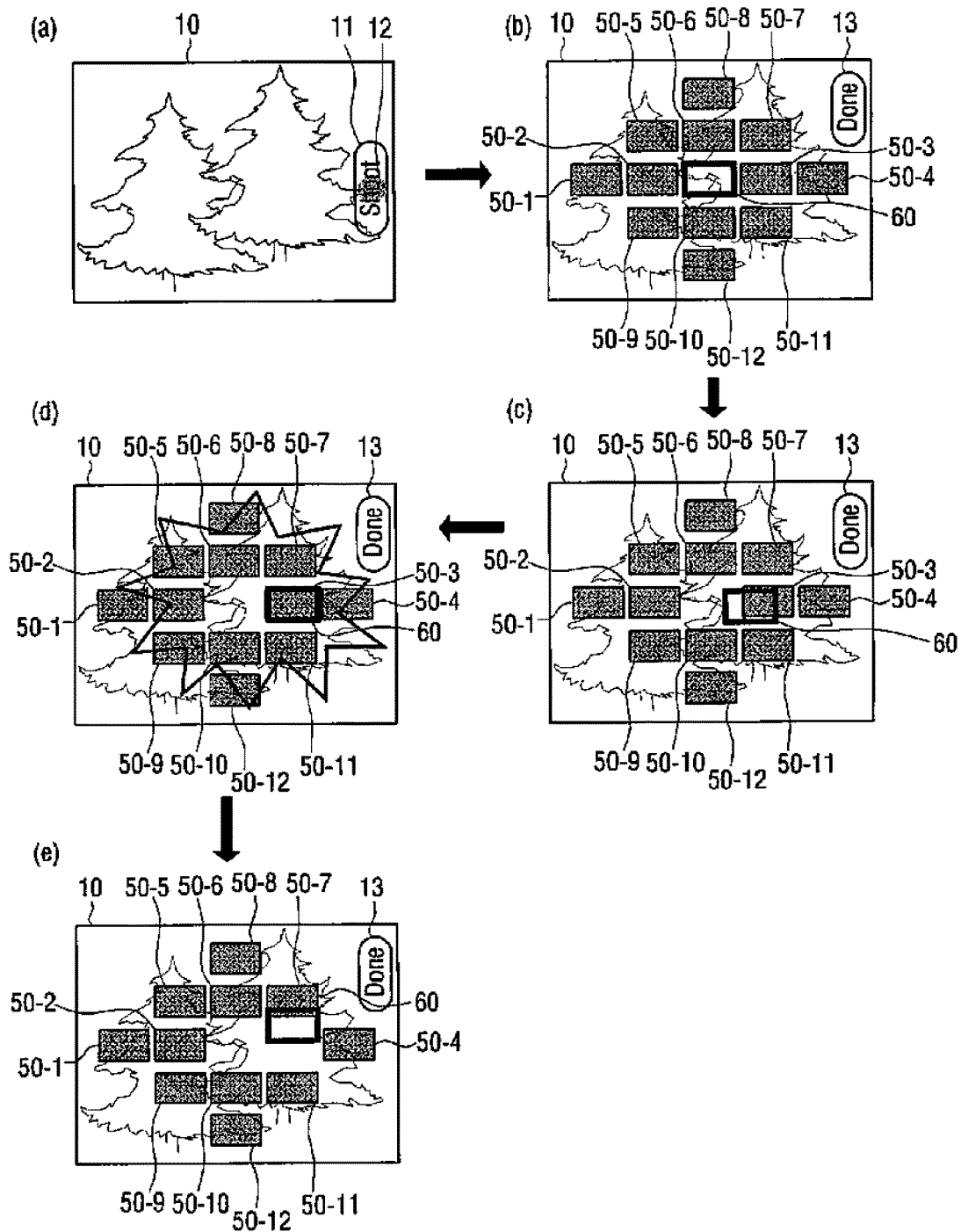
FIG. 2 is a view illustrating an example of a screen on which a plurality of guide images are displayed.

FIG. 2 illustrates a photographing screen according to various embodiments. As shown in part (a) of FIG. 2, a screen image including images of subjects within a photographing range is displayed on a screen 10 of the photographing apparatus 100. An area 11 to input a photographing command may also be displayed on the screen 10. The user may input the photographing command by touching area 12 of the area 11. Part (a) of FIG. 2 illustrates the screen implemented as a touch screen. If the photographing command is input through a key rather than the touch screen, area 11 may not be displayed.

If mode conversion is achieved by selecting a panorama photographing mode and a photographing step is performed, a plurality of guide images 50-1 to 50-12 and a photographing focus 60 are displayed on the screen image 10 as shown in part (b) of FIG. 2. The guide images 50-1 to 50-12 are arranged in vertical and horizontal directions with reference to a center of the screen. If an initial photographing step has been performed, the guide image may be omitted from the center of the screen and instead the photographing, focus 60 may be placed on the center of the screen as shown in part (b) of FIG. 2. However, if it is implemented to display the plurality of guide images right after the mode conversion without performing the initial photographing, the guide image may also be displayed on the center of the screen. The initial position of the photographing focus 60 may thus overlap the guide image on the center of the screen or may be a different position.

The maximum number of guide images 50-1, 50-2, 50-3, 50-4 are displayed in a center line including an initially photographed image. Less than the maximum number of guide images are displayed in upper and lower lines of the center line. In the outermost lines, i.e., the uppermost line and the lowest line, the lowest number of guide images 50-8, 50-12 are displayed. Referring to part (b) of FIG. 2, four guide images are displayed in the center line, three guide images are displayed in each of the upper and the lower lines of the center line, and one guide image is displayed in each of the uppermost line and the lowest line.

The total number of guide images may vary depending on the specification of the photographing apparatus 100. In other words, if the photographing apparatus 100 has a big photographing angle, it contains subjects within a 360-degree range in relatively fewer images.

Therefore, the number of guide images is relatively low. For example, if the photographing apparatus 100 can photograph subjects within a 60-degree range at a time, about 6 guide images may be displayed in the center line. On the other hand, if the photographing apparatus 100 has a small photographing angle, the number of images required increases. Therefore, the number of guide images increases. For example, if the photographing apparatus 100 can photograph subjects with a 30-degree range at a time, at least 12 guide images may be displayed in the center line.

Thus, the user moves the photographing focus 60 by moving the photographing apparatus 100. If the photographing focus 60 moves to the right guide image 50-3 as shown in part (c) FIG. 2 and overlaps the guide image 50-3 as shown in part (d) of FIG. 2, a photographing step is performed at that moment. As shown in (d) of FIG. 2, a visual effect alerting the user of a current photographing situation may be displayed. Specifically, a graphic effect like a flash is output on the screen so that the user can recognize that auto-photographing step is performed.

Although part (d) of FIG. 2 shows that the visual effect is displayed, a sound effect may, for example, be output instead of the visual effect. If the photographing apparatus 100 is provided with a sound output element such as a speaker, a beep or other sound may be output at when the photographing focus 60 overlaps the guide image 50-3. The visual effect and the sound effect may be output together for the user.

If the auto-photographing step is achieved, the corresponding guide image 50-3 may be deleted or its display state may be changed. Specifically, the change of the display state may mean change of a color of the guide image or change to an inactive state of the guide image by being blurred. Alternatively, the corresponding guide image may be given an animation effect as if it is popped out from the whole arrangement of the guide images or it moves to a certain area (not shown) provided on a part of the screen 10. Accordingly, the user can easily recognize that one image for forming the panoramic image has been created.

If the photographing step for the one guide image 50-3 has been completed, the user moves the photographing focus 60 to the next guide image by moving the photographing apparatus 100. Referring to part (e) of FIG. 2, the photographing focus 60 moves to the guide image 50-7 in the upper line. A photographing direction and a photographing order for forming the panoramic image may be set by the user. Therefore, a user has more order choice. Moreover, the user can intuitively know which part of the whole subject has been currently photographed.

In the method described above, the user performs the photographing step by matching the photographing focus 60 with all of the guide images in sequence. Accordingly, if the photographing step has been completed for all of the guide images, the panoramic image is generated by combining the image data.

As shown in parts (b) to (e) of FIG. 2, a menu 13 to input a command to finish the photographing step may be displayed on a certain area of the screen. Accordingly, if the user inputs the command to finish photographing even before the photographing for all of the guide images has been completed, the photographing step finishes and the panoramic image is generated by combining the image data that has been photographed by that time. If the touch screen is not provided, the command to finish the photographing step may be input through the key of the photographing apparatus 100.

Also, as shown in FIG. 2, the plurality of guide images and the photographing focus 60 may be generated in a form corresponding to a reduced image of the screen image.

Also, an image after a currently displayed screen image is shifted to correspond to change of a photographing angle may be displayed as the guide image. For example, if a currently photographed image is to be placed on the center of the screen, the right guide image 50-3 may be an image after the currently photographed image is rotated clockwise by about 60 degrees and the next right guide image 50-4 may be an image after the currently photographed image is rotated clockwise by 120 degrees. The upper guide image 50-6 may be an image after the currently photographed image is moved up by 45 degrees, and the lower guide image 50-10 may be an image after the currently photographed image is moved down by 45 degrees.

Further, the guide images and the photographing focus may be displayed in an empty box shape with only edges.

Figure 3:
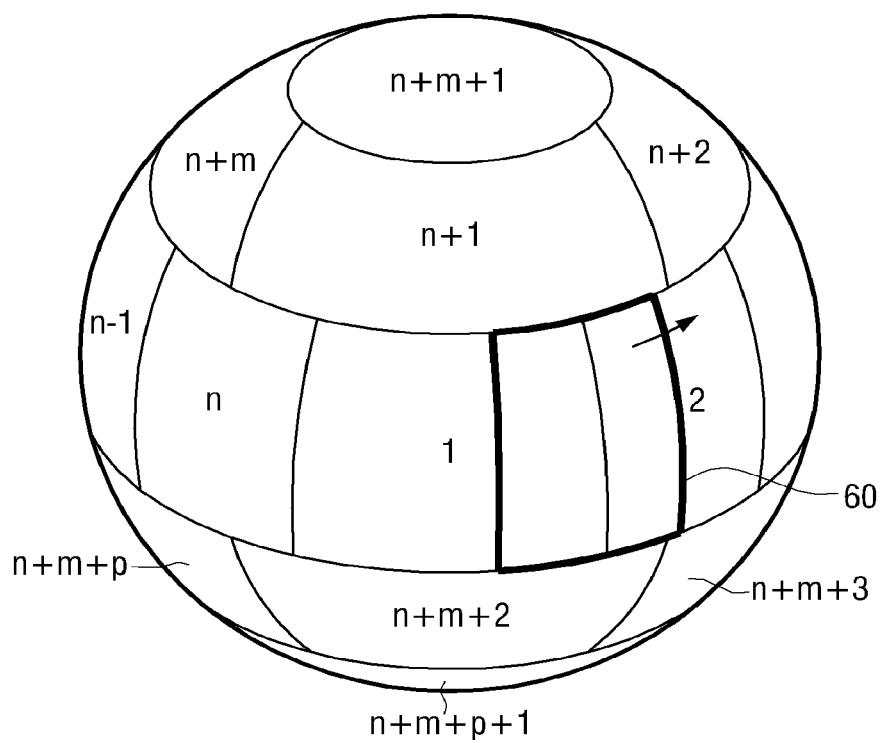
FIG. 3 illustrates an example of a spherical panoramic image.

FIG. 3 illustrates a spherical panoramic image. As shown in FIG. 3, the photographing apparatus 100 generates a plurality of images 1, 2, . . . , n, n+1, . . . , n+m, n+m+1, . . . , n+m+p, and n+m+p+1) and generates a single spherical panoramic image by combining the plurality of images. The photographing apparatus 100 located at the center of the sphere of FIG. 3 photographs in vertical and horizontal directions according to the guide images. In other words, the user photographs images by matching the photographing focus 60 with each guide image by moving the photographing apparatus 100. If the guide images corresponding the images constituting the spherical panoramic image of FIG. 3 are represented on a plane screen, the guide images are displayed as shown in (b) of FIG. 2. Considering that the sphere has a greatest diameter at the center portion, the maximum number of guide images are needed to photograph an image to be placed in the center line. As the line is located farther from the center line, the number of needed images decreases and, thus, the number of guide images decreases.

Accordingly, one guide image is provided for the images n+m+1, n+m+p+1 placed on the uppermost portion and the lowest portion of the sphere.

In FIG. 2, the guide image that has been photographed is deleted. However, the guide image may be differentiated from the other guide images by changing the display state of the guide image.

Figure 4:
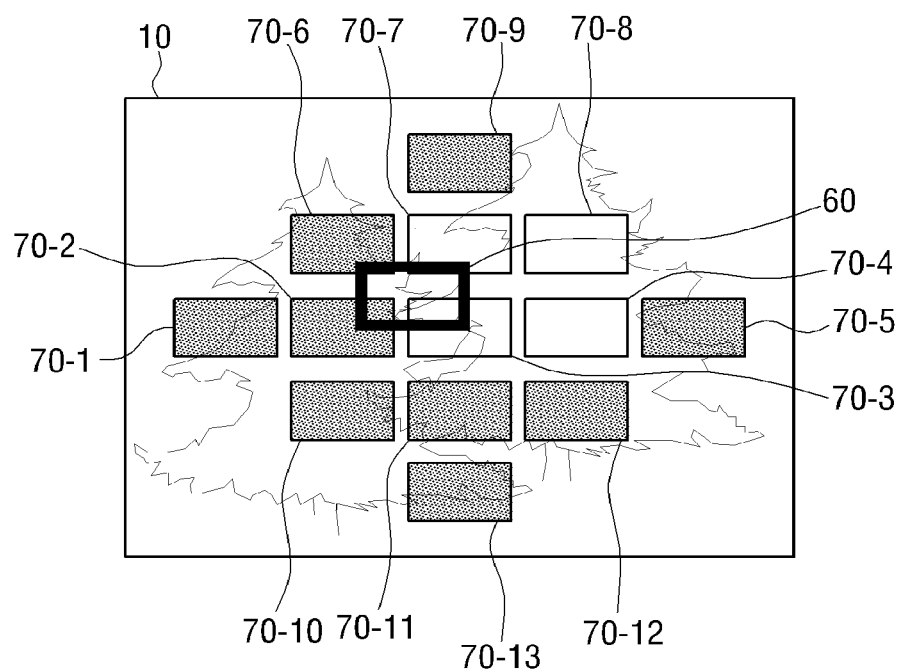
FIG. 4 illustrates a method for changing a display state of a guide image that has been photographed among a plurality of guide images.

FIG. 4 illustrates a different form of the guide images. In FIG. 4, a guide image 70-3 is displayed at a center of a screen. Accordingly, five guide images 70-1-70-5 are displayed in a center line, three guide images 70-6-70-8, 70-10-70-12 are displayed in each of upper and lower lines, and one guide image 70-9, 70-13 is displayed in each of an uppermost line and a lowest line. A photographing focus 60, which is initially displayed on a predetermined area on the screen (for example, a center portion or one of edges of the screen) moves according to the motion of the photographing apparatus 100. If the photographing focus 60 matches one of the guide images, an auto-photographing step is performed and a display state of the corresponding guide image is changed. As shown in FIG. 4, the display state of the guide images 70-3, 70-4, 70-7, 70-8, which have been photographed, are changed to an inactive state. The user continues to perform panorama photographing while moving the photographing focus 60 to the other guide images remaining activated.

Figure 5:
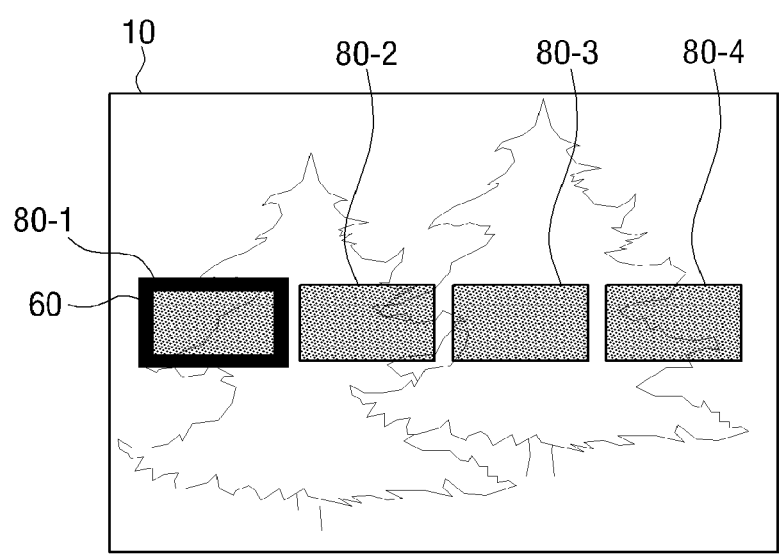
FIG. 5 illustrates an example of a guide image for photographing a general panoramic image.

FIG. 5 illustrates an example of guide images for photographing a general panoramic image. Since no upper and lower image is not required for photographing the general panoramic image, guide images 80-1, 80-2, 80-3, 80-4 are displayed in a single line on a screen 10. In this state, if a photographing focus 60 matches one of the guide images, the corresponding guide image may be deleted or its display state may be changed.

As described above, if photographing is performed using the guide images, the user can intuitively distinguish between a photographed portion and a non-photographed portion of the whole panoramic image, and can also freely determine a photographing order as he or she wishes.

Figure 6:
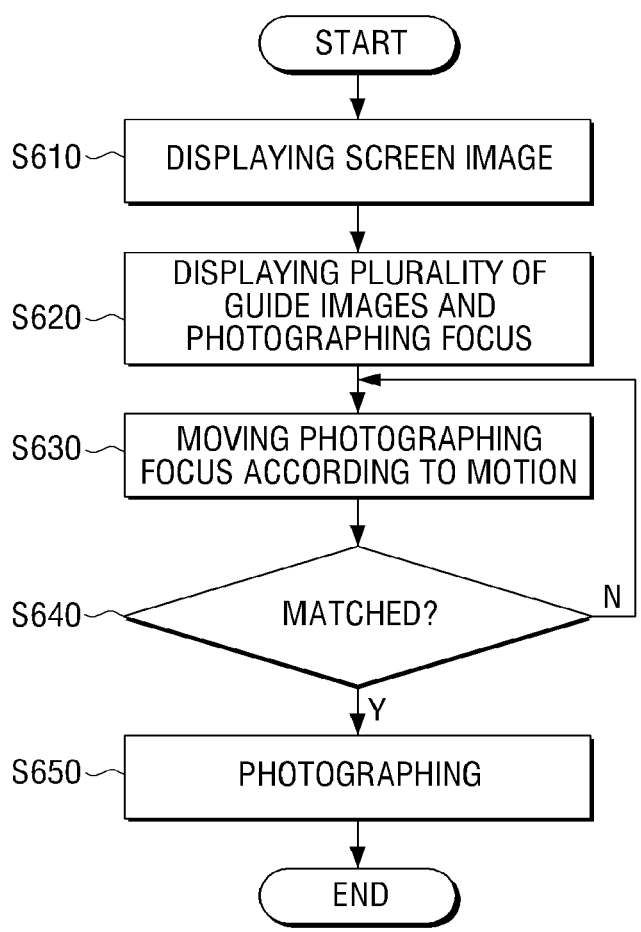
FIGS. 6 and 7 are flowcharts illustrating a method for photographing a panoramic image according to embodiments of the present invention.

FIG. 6 is a flowchart illustrating a method for photographing a panoramic image according to an embodiment. Referring to FIG. 6, a screen image is displayed in step S610 and a plurality of guide images and a photographing focus are displayed on the screen image in step S620.

In this state, the photographing focus is move according to a motion of the photographing apparatus 100 in step S630. If the photographing focus matches one of the guide images in step S640, a photographing step is performed in step S650.

The determination of whether the photographing focus matches the guide image or not by comparing coordinate values on the screen. Specifically, if the whole screen is divided by horizontal and vertical axes, each corner of the photographing focus and the guide image may be represented by (x,y) coordinate values. The photographing apparatus 100 directly compares these coordinate values and performs photographing if the coordinate values are identical. If the coordinate values are close to each other within a predetermined allowable range, then the coordinate values are considered identical and the photographing step is performed.

According to another embodiment, if the photographing focus matches the guide image, a sound effect or a visual effect may be provided to inform the user that a photographing time has arrived, instead of performing the auto-photographing step. Therefore, the user may directly input a command to perform the photographing step.

Moreover, if the photographing focus matches a part of the guide image, the user may be informed that a photographing time has arrived and may get ready to photograph. The photographing step performed by the photographing apparatus 100 is not necessarily an auto-photographing and may be manual photographing.

Figure 7:
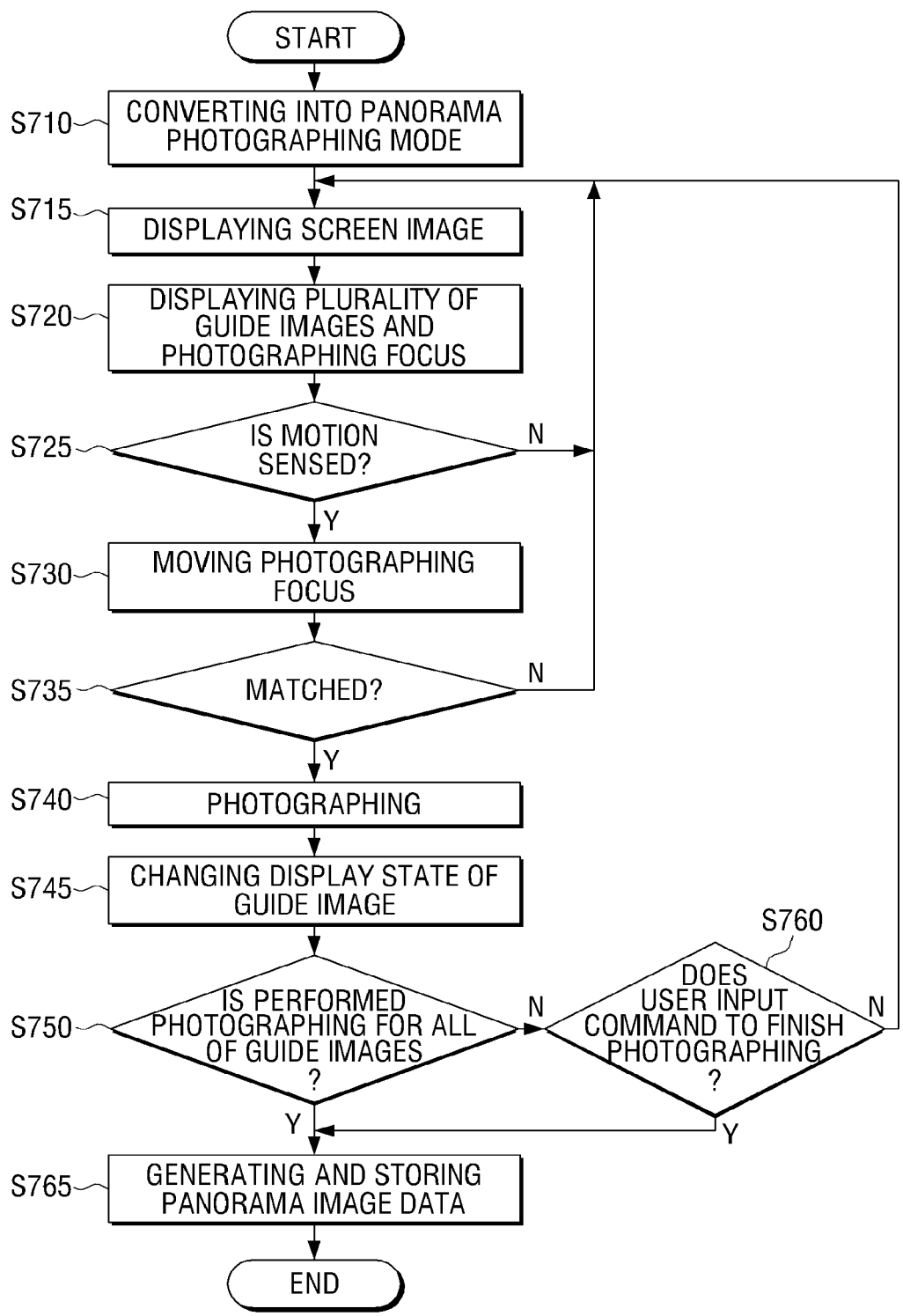

FIG. 7 is a flowchart illustrating a method for photographing a panoramic image according to an embodiment in more detail.

If a mode is converted into a panorama photographing mode in step S710, in a state of a screen image being displayed in step S715 and a plurality of guide images and a photographing focus are displayed in step S720. The user may convert the mode into the panorama photographing mode by selecting a mode conversion menu from menu items of the photographing apparatus 100.

In this state, if a motion of the photographing apparatus 100 is sensed in step S725, the photographing focus is moved according to the motion of the photographing apparatus 100 in step S730. If the photographing focus matches one of the guide images in step S735, photographing is performed in step S740.

If the photographing step is completed, a display state of the corresponding guide image is changed in step S745. The change of the display state is achieved by changing color, flickering state, clarity, or size of the guide image. Also, the guide image itself may be deleted. If photographing for one guide image is completed, it is determined whether photographing for all of the guide images has been completed, i.e., whether there is a remaining guide image or not in step S750. If it is determined that photographing for all of the guide images has been completed, panoramic image data is generated by combining images generated by that time and is stored in step S765.

On the other hand, if the photographing for all of the guide images have not been completed, it is determined whether the user stops the photographing step in step S760. In other words, it is determined whether the user inputs a command to finish the photographing step. If the command to finish the photographing step is input, panoramic image data is generated by combining images photographed by that time and is stored in step S765. However, if no such command is input, the above-described steps are repeated. Where the guide images remain on the screen image, photographing is performed if the photographing focus matches the guide image as a result of being moved according to the motion of the photographing apparatus 100.

In the above-described method for photographing the panoramic image, the guide images and the photographing focus may be provided in various forms as shown in FIGS. 2 to 5. In particular, the method may further include a step of providing at least one of a sound effect and a visual effect when auto-photographing is performed.

The method for photographing the panoramic image according to various embodiments may be implemented as a program code and may be stored in various recording media. Specifically, the method may be stored in a variety of recording media readable by a terminal, such as a Random Access Memory (RAM), a flash memory, a Read Only Memory (ROM), an Erasable PRogrammable ROM (EPROM), an Electronically Erasable and Programmable ROM (EEPROM), a register, a hard disk, a removable disk, a memory card, an USB memory, and a CD-ROM. Accordingly, a program may be installed so that the above-described method can be executed in a device to which such a recording medium is connected or mounted.

While the invention has been shown and described with reference to certain embodiments thereof, it will be understood by those skilled in the art that various changes in form and details may be made therein without departing from the spirit and scope of the invention. Therefore, the spirit and scope of the present invention must be defined not by the described embodiments thereof but by the appended claims and their equivalents.

The invention claimed is:

1. An electronic device comprising:
a touch display; and
a processor configured to:
control to obtain a first image for a panoramic image,
control the touch display to present a screen including a preview image, which is an image being provided on the touch display for obtaining an image, a first visual element which moves for obtaining a second image, and a second visual element which remains at a position during the movement of the first visual element, the first visual element starting to be presented on the touch display for a first time in a panoramic image capturing mode in response to obtaining the first image and being continuously presented on the touch display as the first visual element visibly approaches the second visual element, and
control to obtain the second image for the panoramic image in response to a substantial overlap between the first visual element and the second visual element,
wherein the first visual element and the second visual element have an approximate same size when the first visual element and the second visual element are substantially overlapped.

2. The electronic device as claimed in claim 1, wherein the second visual element is among a plurality of second visual elements,
wherein the processor, in response to a substantial overlap between one of the plurality of the second visual elements and the first visual element, controls the touch display to change a display state of the overlapped second visual element.

3. The electronic device as claimed in claim 2, wherein the processor, in response to a substantial overlap between another one of the plurality of the second visual elements and the first visual element, controls to obtain a third image for the panoramic image and controls the touch display to change a display state of the overlapped another second visual element.

4. The electronic device as claimed in claim 2, wherein the processor, in response to a substantial overlap between all of the plurality of the second visual elements and the first visual element which occurs sequentially, generates a panoramic image based on obtained images.

5. The electronic device as claimed in claim 2, wherein the plurality of the second visual elements, in response to the panoramic image being an image in a horizontal direction, are arranged and displayed in a single line on a screen image, and in response to the panoramic image being a 360° spherical image having a single spherical surface, are arranged and displayed in a plurality of lines on the image screen, a number of guide images for each line being maximum in a middle line and decreasing sequentially towards outer lines with reference to the middle line.

6. The electronic device as claimed in claim 1, further comprising:
a storage configured to store the first image and the second image for the panoramic image.

7. A method of photographing a panoramic image of an electronic device, the method comprising:
obtaining a first image for a panoramic image;
presenting a preview image, which is an image being provided on a touch display of the electronic device for obtaining an image, a first visual element which moves for obtaining a second image, and a second visual element which remains at a position during the movement of the first visual element; and
obtaining the second image for the panoramic image in response to a substantial overlap between the first visual element and the second visual element,
wherein the first visual element starts to be presented on the touch display for a first time in a panoramic image capturing mode in response to obtaining the first image and is continuously presented on the touch display as the first visual element visibly approaches the second visual element, and wherein the first visual element and the second visual element have an approximate same size when the first visual element and the second visual element are substantially overlapped.

8. The method as claimed in claim 7, wherein:

the second visual element is from among a plurality of second visual elements; and the method further comprises, in response to a substantial overlap between one of the plurality of the second visual elements and the first visual element, changing a display state of the overlapped second visual element.

9. The method as claimed in claim 8, further comprising:

in response to a substantial overlap between another one of the plurality of the second visual elements and the first visual element, obtaining a third image and changing a display state of the overlapped another second visual element.

10. The method as claimed in claim 8, further comprising:

in response to a substantial overlap between all of the plurality of the second visual elements and the first visual element which occurs sequentially, generating the panoramic image based on obtained images.

11. The method as claimed in claim 8, wherein the plurality of the second visual elements, in response to the panoramic image being an image in a horizontal direction, are arranged and displayed in a single line on a screen image, and in response to the panoramic image being a 360° spherical image having a single spherical surface, are arranged and displayed in a plurality of lines on the image screen, a number of guide images for each line being maximum in a middle line and decreasing sequentially towards outer lines with reference to the middle line.

12. The method as claimed in claim 7, further comprising:

storing the first image and the second image for the panoramic image.

13. A non-transitory computer readable recording medium having recorded thereon a program executable by a processor for performing a method of photographing a panoramic image, the method comprising:

obtaining a first image for a panoramic image;

controlling a touch display to present a preview image, which is an image being provided on the touch display of an electronic device for obtaining an image, a first visual element which moves for obtaining a second image, and a second visual element which remains at a position during the movement of the first visual element; and obtaining the second image for the panoramic image in response to a substantial overlap between the first visual element and the second visual element, wherein the first visual element starts to be presented on the touch display for a first time in a panoramic image capturing mode in response to obtaining the first image and is continuously presented on the touch display as the first visual element visibly approaches the second visual element, and wherein the first visual element and the second visual element have an approximate same size when the first visual element and the second visual element are substantially overlapped.

* * * * *